Dec. 22, 1953  G. P. DORSCHEID  2,663,316
FLUID PRESSURE CONTROL VALVE
Filed Dec. 14, 1949
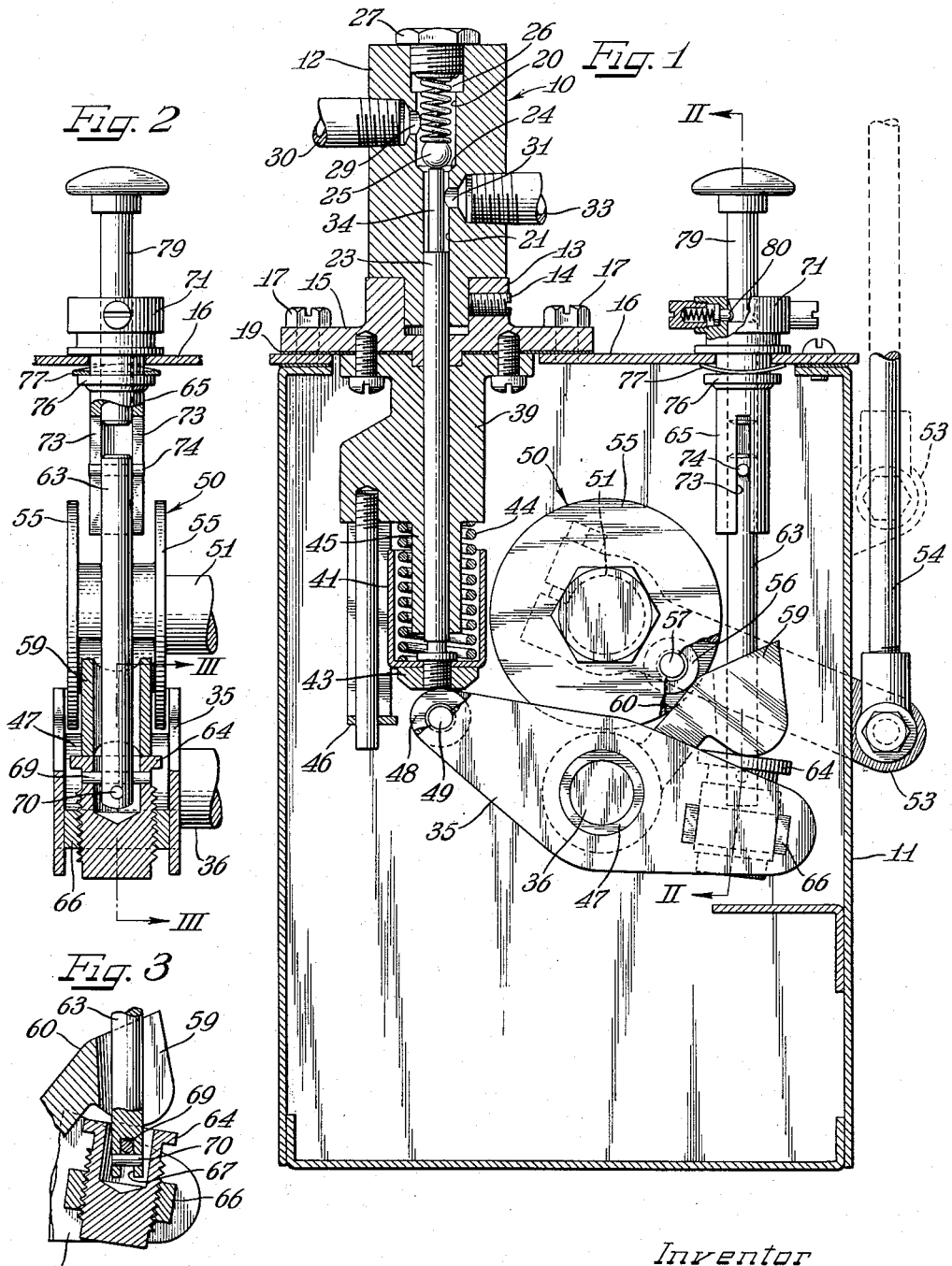
Inventor
George P. Dorscheid
by The Firm of Charles W. Hills
Attys Patented Dec. 22, 1953

2,663,316

UNITED STATES PATENT OFFICE 2,663,316

FLUID PRESSURE CONTROL VALVE

George P. Dorscheid, Buffalo, N. Y., assignor to Frontier Industries, Inc., Buffalo, N. Y., a corporation of New York Application December 14, 1949, Serial No. 132,941

9 Claims. (Cl. 137—632)

This invention relates to improvements in fluid pressure control valves and more particularly to such valves adapted to periodically measure given volumes of air under pressure.

My invention has as its principal object to provide a simplified form of fluid pressure control valve and a novel and simplified form of construction selectively operable to supply given volumes of fluid under pressure for the aspiration of a liquid.

A further object of my invention is to provide a new and improved form of air control valve particularly arranged to periodically open and intermittently supply air for the aspiration of a lubricant and selectively adjustable to vary the time intervals of the air supply and the volume of air delivered through the valve.

A further and more detailed object of my invention is to provide a measuring valve for measuring and periodically supplying air under pressure for the aspiration of fluid for lubricating or like purposes, together with a novel arrangement of power operated cam and lever means for opening the valve, variable at the will of the operator, to vary the time interval of opening the valve without varying the speed of travel of the cam means.

A still further and more detailed object of my invention is to provide a fluid pressure control for delivering given quantities of air under pressure for the aspiration of fluid, such as a lubricant, so arranged that the volume of air delivered may be varied at the will of the operator, and including a rocking member having operative connection with the valve for periodically opening the valve, a pivotally movable cam, and an operative and engaging connection between said cam and rocking member, variable with respect to said rocking member, to vary the length of stroke of the valve and the length of time the valve remains open.

These and other objects of my invention will appear from time to time as the following specification proceeds and with reference to the accompanying drawings, wherein:

Figure 1 is a transverse sectional view taken through a variable delivery valve constructed in accordance with my invention;

Figure 2 is a fragmentary longitudinal sectional view taken substantially along line II—II of Figure 1; and Figure 3 is an enlarged fragmentary detail sectional view showing certain details of the engaging connection between the cam lever and rocking member for operating the valve, and the means for varying the angular relation of the cam lever and rocking member with respect to each other.

In the drawing, a valve 10 is shown as being mounted on and projecting from the top of a casing 11 containing a mechanism for operating said valve. The casing 11 may contain oil and also may contain a plurality of lubricating pumps (not shown) for pumping oil therefrom to supply lubricant for punches, dies, shear blades, various other forms of tools, internal combustion or steam engines, or any other type of equipment requiring lubrication. A lubricant may be aspirated into a spray by air delivered from the valve 10. The lubricating pumps may be driven by the means for operating said valve and form no part of my present invention so are not herein shown or described.

The valve 10 includes a valve block 12 projecting upwardly from an annular boss 13 and extending within said boss and secured thereto as by a set screw 14. The annular boss 13 is herein shown as being formed integrally with and as projecting upwardly from a support member 15 secured to a top cover 16 of a casing 11 by machine screws 17—17 and sealed thereto by a gasket 19.

The valve block 12 has a valve chamber 20 formed therein and herein shown as extending vertically along the center of said valve block. The chamber 20 communicates at its lower end with a passageway 21 of smaller diameter than said chamber and in axial alignment therewith. Passageway 21 forms a passageway for the delivery of air from said valve block and also forms a slidable guide for a valve plunger 23. An inclined annular wall 24 connects the passageway 21 with the passageway 20 and forms a seat for a valve element 25. The valve element 25 may be of any well known form, but is herein shown as being a ball type of valve element held in engagement with its seat by a compression spring 26. Said compression spring is interposed between said valve element 25 and a retaining and adjusting nut 27. Said adjusting nut is threaded in an enlarged top portion of the chamber 20 and serves to close the top of said chamber and pre-load the spring 26.

An inlet 29, for fluid under pressure such as compressed air, enters the side wall of the valve chamber 20 above the valve element 25. A fitting 30 is herein shown as being threaded within said inlet. The fitting 30 may be connected to a source of fluid under pressure, such as an air compressor or accumulator for air under pressure, to supply air under pressure to the valve chamber 20. An outlet passageway 31 leads from the passageway 21 beneath the valve element 25 to deliver predetermined volumes of air from the chamber 20 through a fitting indicated generally by reference character 33. The fitting 33 may have a hose connected thereto which may be connected to one of a number of lubricating spray nozzles to aspirate or spray lubricant on the parts it is desired to lubricate. It is, of course, evident that the air supplied through the pressure outlet 31 may also be used for other aspirating or spraying purposes than for aspirating a lubricant.

The plunger 23 has a reduced upper end portion 34 extending along the passageway 21 and spaced inwardly from the walls thereof to allow fluid under pressure to pass therealong through the pressure outlet 31, and is herein shown as engaging valve element 25 to move said valve element off its seat against pressure in the chamber 20 and against the compression spring 26. The plunger 23 is moved in a direction to unseat the valve 25 by means of a rocking member 35 rockingly mounted in the casing 11 on a transverse shaft 36. The shaft 36 is suitably mounted in the casing 11 and may also have the means for operating the oil pumps mounted thereon, where one or more oil pumps are mounted in the casing 11. The plunger 23 is guided in a guide block 39 secured to and depending from the bottom of the support member 15. A cup-like cage 41 is mounted on the lower end of the plunger 23 and extends upwardly therealong and is secured thereto as by a nut 43 threaded on the end of said plunger. The cage 41 forms an enclosure for a compression spring 44 extending within said cage and encircling the plunger 23 and a depending boss 45 of the guide block 39. The spring 44 urges the plunger 23 in engagement with the rocking member 35 and in a direction to allow the valve element 25 to seat itself. A stop 46 depends from the block 39 and serves to limit downward movement of the plunger 23. The rocking member 35 is herein shown as being formed from two parallel spaced aligned parts mounted adjacent opposite ends of a sleeve 47 and extending in opposite directions therefrom. A roller 48 engaging the plunger 23 is mounted on one end of the rocking member 35 between the sides thereof on a pin 49.

The rocking member 35 is rocked to periodically open the valve element 25 by means of a cam 50 mounted on a cam shaft 51. The cam 50 is herein shown as being reciprocably moved by a rocking arm 53 secured to cam shaft 51 on the outside of casing 11 and having a puller rod 54 pivotally connected thereto. The puller rod 54 may be reciprocably driven in any suitable manner, as by the mechanism to be lubricated or by separate power operated means. While the cam 50 is herein shown as being reciprocably driven, it need not be so driven, and may be rotatably driven if desired. The cam 50 is herein shown as being formed from two spaced connected circular disks 55—55 mounted on the cam shaft 51 and having a cam roller 56 mounted therebetween on a pivotal pin 57. The cam disks 55—55 are herein shown as extending along opposite sides of a rocking member or cam lever 59 pivotally mounted on the sleeve 47 between the sides of the rocking member 35 for rocking movement with respect thereto. Cam lever 59 has a cam face 60 engaged by the cam roller 56 and intermittently depressed by said roller upon rocking movement of the cam 50.

The outer end portion of the cam lever 59 is bifurcated and extends along opposite sides of a vertical rod 63, extending upwardly from an adjustable engaging member 64 and guided at its upper end on a guide member 65 depending from the cover 16. The lower end portions of the bifurcated outer end portion of the cam lever 59 are of an arcuate formation and have slidable bearing engagement with the upper surface of the adjusting member 64. The engaging member is herein shown as being threaded within a threaded block 66 mounted between the sides of the rocking member 35 and has an upwardly opening hollow portion within which extends the lower end of the rod 63. A slot 67, opening toward the ground, is formed in the lower end of the rod 63 and extends along opposite sides of a pin 69 extending across the hollow portion of the engaging member 64 and secured thereto. A retaining pin 70 extending across the slotted portion of the rod 63 is provided to retain said rod to the pin 69.

The rod 63 forms a means for turning the adjusting member 64 to vary the point of engagement of the cam lever 59 with respect to the rocking member 35 and the resultant angular relationship of the cam lever 59 with respect to the rocking member 35. The rod 63 is adjustably turned by a regulating nut 71 on the top of the cover 16 and having the guide member 65 suitably secured thereto and depending therefrom into the casing 11. The guide member 65 is slotted as indicated by reference character 73, and the slots thereof are engaged by a pin 74 extending transversely through the rod 63. A retaining collar 76 is herein shown as being secured to the guide member 65 beneath the cover 16 and as engaging the underside of a leaf spring 77, yieldably restraining said guide member from rotation. The regulating nut or member 71 on the top of the cover 16 may be gripped by the hand to turn the rod 63 and the adjusting member 64 and thus vary the angular relationship between the cam lever 59 and the rocking member 35 and the length of stroke of the plunger 23 and the volume of air discharged by the valve 25 for each stroke of said plunger.

A hand-operated plunger 79 is slidably mounted in the guide member 65 for movement into engagement with the upper end of the rod 63 to open the valve 25 by hand if desired. Spring-pressed detents 80—80 are herein shown as holding said hand plunger in an upwardly extended position out of engagement with the plunger 63.

It may be seen from the foregoing that reciprocable movement of the cam 50 will depress the cam lever 59 upon downward movement of the cam roller 56 and that this will in turn rock the rocking member 35 through the bearing engaging connection between the cam lever 59 and the adjusting member 64. This will elevate the roller 48 and plunger 23 and lift the valve element 25 off its seat and release a predetermined volume of air through the outlet 31, determined by the length of time said valve element is off its seat, regardless of the pressure of the air in the compressed air line 30. Upon return movement of the cam roller 56, the spring 44 will depress the roller 48 and move the cam lever 59 upwardly to follow said roller, thus permitting the spring 26 and pressure in the chamber 20 to seat the valve element 25 and close the valve.

It may further be seen that the volume of air supplied through the passageway 31 for each stroke of the plunger 23 may be varied by varying the length of the stroke of the plunger 23 and thus varying the opening between the valve element 25 and its seat and the length of time the valve element 25 remains off its seat, and that this is attained by varying the angular relationship between the rocking member 35 and the cam lever 59 by adjustment of the adjusting member 64.

It should further be noted that where the cam 50 may be rotatably driven that either one or a plurality of rollers, like the rollers 56, may be provided to periodically rock said cam lever and rocking member as desired while the cam continuously rotates in one direction.

It will be understood that modifications and variations may be effected without departing from the scope of the novel concepts of the present invention.

I claim as my invention:

1. In a valve for metering predetermined volumes of air under pressure, a valve chamber, an inlet for air under pressure to said chamber, an outlet therefrom, a valve element seated in said chamber controlling the passage of air through said outlet, a plunger engageable with said valve element to move said valve element to an open position, a rocking member pivoted intermediate its ends and having operative engagement with said plunger at one of its ends, a cam lever mounted for pivotal movement about an axis coaxial with the axis of rocking movement of said rocking member, an engaging member having threaded engagement with said rocking member adjacent the end thereof opposite from said plunger, a reciprocable cam having operative engagement with said cam lever to pivot said cam lever and rocking member upon movement thereof and to move said valve element off its seat, and extensible means operatively connected with said engaging member to vary the position thereof with respect to said rocking member and the angular relationship between said rocking member and cam member and the length of stroke of said plunger and the resultant volume of air discharged by said valve and an operating member normally biased out of engagement with said extensible means manually operable to engage the same and operate said rocking member and valve element independently of said cam.

2. In an air control valve arranged to periodically deliver predetermined volumes of air under pressure, a valve chamber, an inlet for air under pressure to said chamber, an outlet therefrom, a valve element in said chamber between said inlet and said outlet, a plunger for moving said valve element from a closed to an open position, the improvement comprising a rocking member engaging said valve plunger, a second rocking member mounted for rocking movement with respect to said first rocking member about an axis coaxial with the axis of rocking movement of said first rocking member, an engaging connection between said second and said first rocking members, power means for moving said second rocking member in one direction and moving said first rocking member and plunger through said engaging connection, yieldable means for moving said plunger and rocking members in an opposite direction, a member selectively operable to vary the position of said engaging connection between said rocking members and the angular relationship therebetween and the length of stroke of said plunger and the volume of air delivered by said valve, and manually operable means engageable with said member and selectively operable to operate said first rocking member and valve by hand.

3. In an air control valve arranged to periodically deliver predetermined volumes of air under pressure, a valve chamber, an inlet for air under pressure to said chamber, an outlet therefrom, a valve element in said chamber between said inlet and said outlet, a plunger for moving said valve element from a closed to an open position, the improvement comprising a rocking member engaging said plunger, a second rocking member coaxial with said first rocking member and movable with respect thereto, an engaging member adjustably mounted on said first rocking member adjacent the end thereof opposite said plunger, and an engaging connection between said second rocking member and said engaging member, yieldable means for moving said plunger and first and second rocking members in one direction, power means for moving said second and said first rocking members through said engaging connection to open said valve, a member operatively connected with said engaging member, manually operable means connected with said member to vary the position of said engaging member with respect to said first rocking member and the angular relationship between said rocking members and the length of stroke and volume of fluid delivered by said valve, and a manually operable plunger movable into position to engage said member and effect rocking movement of said first rocking member to manually open the valve at will.

4. In a valve, a valve element and operating means therefor to operate said valve and vary the delivery volume thereof including a plunger engageable with said valve element, a rocking member engageable with said plunger at one of its ends, another rocking member coaxial with said first rocking member, an engaging connection between said second and said first rocking members, power means for moving said second rocking member in one direction and moving said first rocking member and plunger through said engaging connection, yieldable means for moving said plunger and rocking members in an opposite direction, means selectively operable to vary the position of said engaging connection between said rocking members and to thereby vary the angular relationship therebetween and the length of stroke of said plunger, and manually operable means engageable with said last mentioned means to operate said rocking member and valve element manually independently of said power means.

5. In a variable stroke operating means, a reciprocably guided plunger, a rocking member engageable with said plunger at one of its ends for moving the same in one direction, a yieldable member biasing said plunger in engagement with said rocking member and moving said plunger in an opposite direction, a cam lever mounted for pivotal movement about an axis coaxial with the axis of rocking movement of said rocking member, an engaging member adjustably mounted on said rocking member adjacent the opposite end thereof from said plunger and having an engaging surface engaged by said cam lever, a pivotally movable cam engageable with said cam lever to intermittently move said cam lever, rocking member and plunger against said yieldable member, and an adjusting member connected with said engaging member and selectively operable to adjustably move said engaging member with respect to said rocking member and vary the angular relation of said cam lever with respect to said rocking member and to vary the stroke of said plunger.

6. A variable delivery valve comprising a valve element, a reciprocable plunger engageable with said valve element for operating the same, means for reciprocally driving said plunger and selectively operable to vary the length of stroke thereof and the delivery volume of the valve including a cam lever mounted for pivotal movement about a fixed axis, a pivotally movable cam engageable with said cam lever, a rocking member mounted for rocking movement about the axis of pivotal movement of said cam lever, an engaging connection between said cam lever and one end of said rocking member, a spring engageable with said plunger and biasing said plunger into engagement with the opposite end of said rocking member from said engaging connection and effecting movement of said plunger in an opposite direction and biasing said cam lever into engagement with said cam, means connected with said engaging connection and operable to vary the angular relationship between said cam lever and rocking member and the volume of fluid delivered by said valve including a reciprocably guided member having connection with said engaging connection and operable to vary the position thereof with respect to said rocking member, and a manually operable plunger movable into position to engage said engaging member and operate said rocking member and valve independently of said cam.

7. In a valve operating means, a valve element, a plunger engageable with said valve element to move said valve element off its seat and open the valve, a rocking member pivoted intermediate its ends and having engagement with said plunger at one of its ends, spring means biasing said plunger into engagement with said rocking member and moving said plunger and rocking member in one direction, a cam lever mounted for movement about the axis of rocking movement of said rocking member, a rotatable cam engageable with said cam lever for moving said rocking member and plunger against the bias of said spring, an adjustable engaging member mounted on said rocking member on the opposite end thereof from said plunger and having an engaging face engaged by said cam lever, means for rotatably moving said cam and rocking said cam lever and rocking member, means selectively operable to adjustably move said engaging member with respect to said rocking member and to vary the angular relationship between said cam lever and rocking member and the length of stroke of said plunger, and a manually operable member biased out of engagement with said last mentioned means to engage said last mentioned means and manually open said valve independently of rotatable movement of said cam.

8. In a variable stroke operating means, a reciprocably guided plunger, a rocking member pivoted for rocking movement about an axis disposed intermediate its ends, a spring biasing said plunger into engagement with one end of said rocking member, a pivotally movable cam and an adjustable operative connection between said cam and rocking member selectively operable to vary the length of stroke of said rocking member and plunger including a cam lever engaged by said cam and mounted for pivotal movement about the axis of rocking movement of said rocking member, an engaging member mounted adjacent the opposite end of said rocking member from said plunger for adjustable movement with respect thereto and having an engaging face engaging said cam lever, means operatively connected with said engaging member and operable to adjustably move said engaging member with respect to said rocking member and vary the angular relationship between said rocking member and cam lever and the length of stroke of said plunger.

9. In a variable stroke operating means, a reciprocably guided plunger, a rocking member pivoted for rocking movement about an axis disposed intermediate its ends, a spring biasing said plunger into engagement with one end of said rocking member, a pivotally movable cam and an adjustable operative connection between said cam and rocking member selectively operable to vary the length of stroke of said rocking member and plunger including a cam lever engaged by said cam and mounted for pivotal movement about the axis of rocking movement of said rocking member, an engaging member mounted adjacent the opposite end of said rocking member from said plunger for adjustable movement with respect thereto and having an engaging face engaging said cam lever, means operatively connected with said engaging member and operable to adjustably move said engaging member with respect to said rocking member and vary the angular relationship between said rocking member and cam lever and the length of stroke of said plunger comprising a slidably guided adjusting member and a plunger in axial alignment with said adjusting member biased out of engagement therewith and selectively operable to engage said adjusting member and operate said rocking member and plunger manually.

GEORGE P. DORSCHEID.

References Cited in the file of this patent

UNITED STATES PATENTS

| Number | Name | Date |
|---|---|---|
| 651,828 | Copland | June 19, 1900 |
| 1,146,850 | Cullum | July 20, 1915 |
| 1,268,128 | Kurtz | June 4, 1918 |
| 1,582,725 | Bethel et al. | Apr. 27, 1926 |
| 1,623,043 | Brown | Apr. 5, 1927 |
| 1,654,557 | Schroder | Jan. 3, 1928 |
| 1,737,165 | Lorenz | Nov. 26, 1929 |
| 1,937,019 | Hamill | Nov. 28, 1933 |
| 2,076,306 | Weeks | Apr. 6, 1937 |